Jan. 23, 1951 — L. J. HIBBARD — 2,539,190

CONTROL SYSTEM FOR ELECTRICALLY-OPERATED VEHICLES

Filed April 19, 1949 — 4 Sheets-Sheet 1

INVENTOR
Lloyd J. Hibbard.
ATTORNEY

Jan. 23, 1951 L. J. HIBBARD 2,539,190
CONTROL SYSTEM FOR ELECTRICALLY-OPERATED VEHICLES
Filed April 19, 1949 4 Sheets-Sheet 3

WITNESSES:
Robert A. Baird
[signature]

INVENTOR
Lloyd J. Hibbard.
BY [signature]
ATTORNEY

Jan. 23, 1951  L. J. HIBBARD  2,539,190
CONTROL SYSTEM FOR ELECTRICALLY-OPERATED VEHICLES
Filed April 19, 1949  4 Sheets-Sheet 4

Fig. 4.

| Step | 1 D | 1 U | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|---|
| 1 | o |  | o | o | o | o |  |  |  |  |  |  |  |  |  |  |  |  |  |  |  |  |  |  |
| 2 |  | o | o | o | o | o |  |  |  |  |  |  |  |  |  |  |  |  |  |  |  |  |  |  |
| 3 | o |  |  | o | o | o | o |  |  |  |  |  |  |  |  |  |  |  |  |  |  |  |  |  |
| 4 |  | o |  | o | o | o | o |  |  |  |  |  |  |  |  |  |  |  |  |  |  |  |  |  |
| 5 | o |  |  |  | o | o | o | o |  |  |  |  |  |  |  |  |  |  |  |  |  |  |  |  |
| 6 |  | o |  |  | o | o | o | o |  |  |  |  |  |  |  |  |  |  |  |  |  |  |  |  |
| 7 | o |  |  |  |  | o | o | o | o |  |  |  |  |  |  |  |  |  |  |  |  |  |  |  |
| 8 |  | o |  |  |  | o | o | o | o |  |  |  |  |  |  |  |  |  |  |  |  |  |  |  |
| 9 | o |  |  |  |  |  | o | o | o | o |  |  |  |  |  |  |  |  |  |  |  |  |  |  |
| 10 |  | o |  |  |  |  | o | o | o | o |  |  |  |  |  |  |  |  |  |  |  |  |  |  |
| 11 | o |  |  |  |  |  |  | o | o | o | o |  |  |  |  |  |  |  |  |  |  |  |  |  |  |
| 12 |  | o |  |  |  |  |  | o | o | o | o |  |  |  |  |  |  |  |  |  |  |  |  |  |  |
| 13 | o |  |  |  |  |  |  |  | o | o | o | o |  |  |  |  |  |  |  |  |  |  |  |  |
| 14 |  | o |  |  |  |  |  |  | o | o | o | o |  |  |  |  |  |  |  |  |  |  |  |  |
| 15 | o |  |  |  |  |  |  |  |  | o | o | o | o |  |  |  |  |  |  |  |  |  |  |  |
| 16 |  | o |  |  |  |  |  |  |  | o | o | o | o |  |  |  |  |  |  |  |  |  |  |  |
| 17 | o |  |  |  |  |  |  |  |  |  |  |  |  |  |  |  | o | o | o | o |  |  |  |  |
| 18 |  | o |  |  |  |  |  |  |  |  |  |  |  |  |  |  | o | o | o | o |  |  |  |  |
| 19 | o |  |  |  |  |  |  |  |  |  |  |  |  |  |  |  |  | o | o | o | o |  |  |  |

Fig. 5.

| Step | 31 | 32 | 33 | 34 | 35 | 36 | 37 | 38 | 39 | 40 | 41 | 42 | P1 | P2 |
|---|---|---|---|---|---|---|---|---|---|---|---|---|---|---|
| 1 | o | o |  |  |  |  |  |  |  |  |  |  | o |  |
| 2 | o | o |  |  |  |  |  |  |  |  |  |  | o | o |
| 3 | o | o | o |  |  |  |  |  |  |  |  |  |  | o |
| 4 | o | o | o | o |  |  |  |  |  |  |  |  |  |  |
| 5 |  | o | o | o |  |  |  |  |  |  |  |  | o |  |
| 6 |  | o | o |  |  |  |  |  |  |  |  |  | o | o |
| 7 |  | o | o | o |  |  |  |  |  |  |  |  |  | o |
| 8 |  | o | o | o | o |  |  |  |  |  |  |  |  |  |
| 9 |  |  | o | o | o |  |  |  |  |  |  |  | o |  |
| 10 |  |  | o | o |  |  |  |  |  |  |  |  | o | o |
| 11 |  |  | o | o | o |  |  |  |  |  |  |  |  | o |
| 12 |  |  | o | o | o | o |  |  |  |  |  |  |  |  |
| 13 |  |  |  | o | o | o |  |  |  |  |  |  | o |  |
| 14 |  |  |  | o | o |  |  |  |  |  |  |  | o | o |
| 15 |  |  |  | o | o | o |  |  |  |  |  |  |  | o |
| 16 |  |  |  | o | o | o | o |  |  |  |  |  |  |  |
| 17 |  |  |  |  | o | o | o |  |  |  |  |  | o |  |
| 18 |  |  |  |  | o | o |  |  |  |  |  |  | o | o |
| 19 |  |  |  |  | o | o | o |  |  |  |  |  |  | o |
| 20 |  |  |  |  | o | o | o | o |  |  |  |  |  |  |
| 21 |  |  |  |  |  | o | o | o |  |  |  |  |  |  |
| 22 |  |  |  |  |  |  | o | o | o | o |  |  |  |  |

Fig. 6.

| Step | 51 | 52 | 53 | 54 | 55 | 56 | 57 | 58 | 59 | 60 | 61 | 62 | P3 | P4 |
|---|---|---|---|---|---|---|---|---|---|---|---|---|---|---|
| 1 | o | o |  |  |  |  |  |  |  |  |  |  | o |  |
| 2 | o | o |  |  |  |  |  |  |  |  |  |  | o | o |
| 3 | o | o | o |  |  |  |  |  |  |  |  |  |  | o |
| 4 | o | o | o | o |  |  |  |  |  |  |  |  |  |  |
| 5 |  | o | o | o |  |  |  |  |  |  |  |  | o |  |
| 6 |  | o | o |  |  |  |  |  |  |  |  |  | o | o |
| 7 |  | o | o | o |  |  |  |  |  |  |  |  |  | o |
| 8 |  | o | o | o | o |  |  |  |  |  |  |  |  |  |
| 9 |  |  | o | o | o |  |  |  |  |  |  |  | o |  |
| 10 |  |  | o | o |  |  |  |  |  |  |  |  | o | o |
| 11 |  |  | o | o | o |  |  |  |  |  |  |  |  | o |
| 12 |  |  | o | o | o | o |  |  |  |  |  |  |  |  |
| 13 |  |  |  | o | o | o |  |  |  |  |  |  | o |  |
| 14 |  |  |  | o | o |  |  |  |  |  |  |  | o | o |
| 15 |  |  |  | o | o | o |  |  |  |  |  |  |  | o |
| 16 |  |  |  | o | o | o | o |  |  |  |  |  |  |  |
| 17 |  |  |  |  | o | o | o |  |  |  |  |  | o |  |
| 18 |  |  |  |  | o | o |  |  |  |  |  |  | o | o |
| 19 |  |  |  |  | o | o | o |  |  |  |  |  |  | o |
| 20 |  |  |  |  | o | o | o | o |  |  |  |  |  |  |
| 21 |  |  |  |  |  | o | o | o |  |  |  |  |  |  |
| 22 |  |  |  |  |  |  | o | o | o | o |  |  |  |  |

WITNESSES:
Robert C Baird
[signature]

INVENTOR
Lloyd J. Hibbard.
BY [signature] Crawford
ATTORNEY

Patented Jan. 23, 1951

2,539,190

UNITED STATES PATENT OFFICE 2,539,190

CONTROL SYSTEM FOR ELECTRICALLY-OPERATED VEHICLES

Lloyd J. Hibbard, Pittsburgh, Pa., assignor to Westinghouse Electric Corporation, East Pittsburgh, Pa., a corporation of Pennsylvania Application April 19, 1949, Serial No. 88,284

19 Claims. (Cl. 318—94)

My invention relates, generally, to control systems and, more particularly, to systems for controlling the operation of electrically operated vehicles, such as railway locomotives, which are equipped with rectifiers for converting alternating current to direct current for the traction motors.

In order to utilize rectifiers of a type and size which have proven satisfactory for industrial applications and which can be economically manufactured, it is necessary to provide a locomotive with a predetermined number of rectifiers which must be operated in multiple or parallel to provide sufficient current for the traction motors of the locomotive.

An object of my invention, generally stated, is to provide a control system for a plurality of rectifiers which shall be simple and efficient in operation, and which may be economically manufactured and installed.

A more specific object of my invention is to increase step-by-step the voltage applied to traction motors which are supplied with current through a plurality of rectifiers.

A further object of my invention is to provide a tap-changing control system for a plurality of rectifiers which supply current to the traction motors of a railway locomotive.

Another object of my invention is to secure the proper division of load between rectifiers operating in parallel.

A still further object of my invention is to reduce the current which may flow during "a backfire" in the rectifiers.

Still another object of my invention is to provide for igniting rectifiers having a plurality of ignition electrodes or igniters.

Other objects of my invention will be explained hereinafter or will be apparent to those skilled in the art.

In accordance with my invention, the rectifiers on a locomotive are divided into groups and cooperating groups are connected to a motor or motors independently of the other groups. The groups of rectifiers are connected to a transformer by means of tap-changing switches, and the proper division of load between the rectifiers of each group is obtained by balance coils. Ignition circuits are provided for the rectifiers, which are of the igniter type.

For a better understanding of the nature and objects of my invention, reference may be had to the following detailed description, taken in conjunction with the accompanying drawings in which:

Figure 1 is a diagrammatic view of a control system embodying the principal features of my invention;

Figure 2:
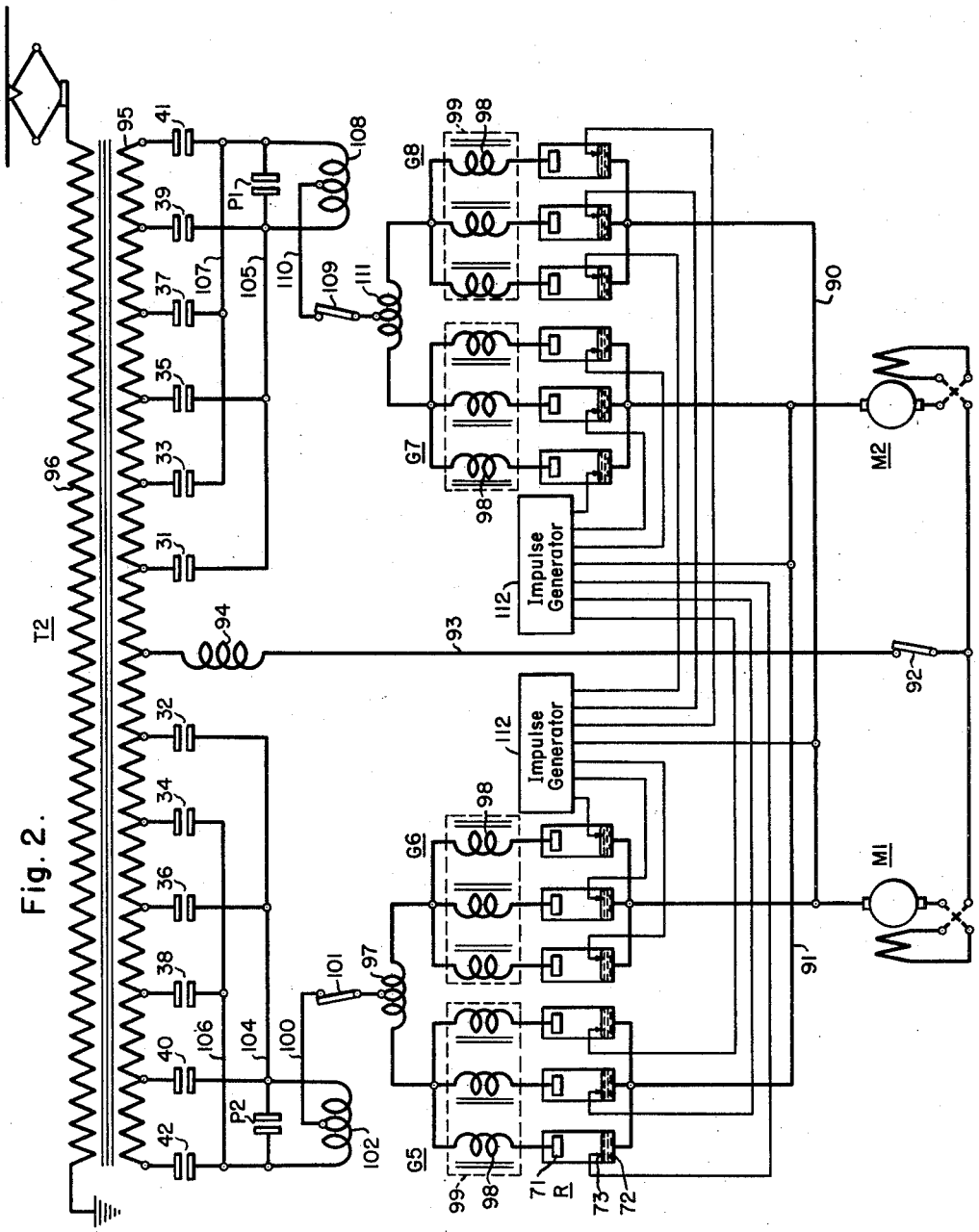
Fig. 2 is a diagrammatic view of a modification of the invention.
Figure 3:
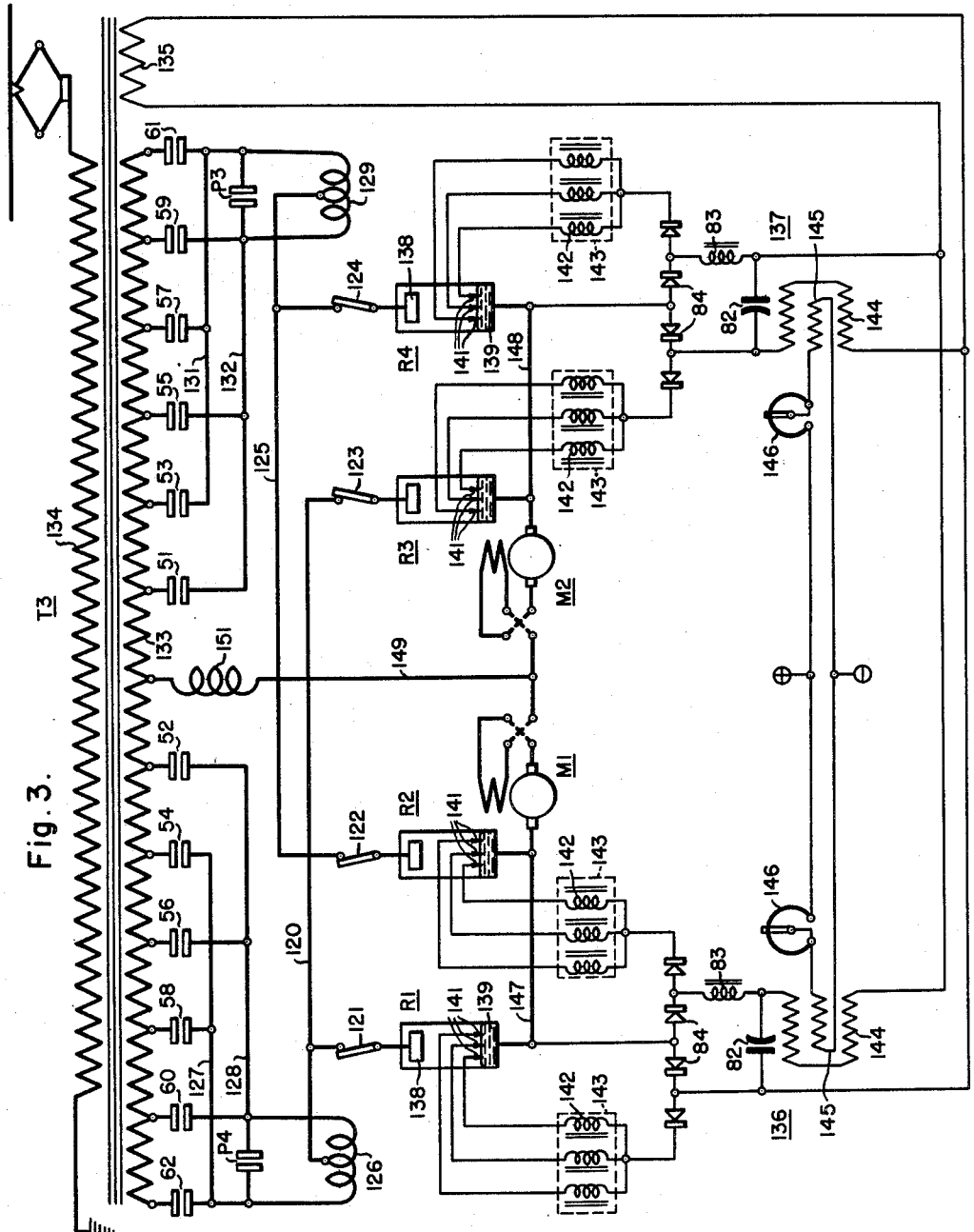
Fig. 3 is a diagrammatic view of another modification of the invention.

Figs. 4, 5 and 6 charts showing the sequence of operation of certain of the switches illustrated in Figs. 1, 2 and 3, respectively.

Referring to the drawings, and particularly to Fig. 1, the system shown therein comprises a plurality of traction motors M1, M2, M3 and M4; a transformer T1 having a primary winding 24 and secondary windings 25, 26 and 27; a plurality of tap-changing switches 1 to 23, inclusive; a plurality of groups of rectifiers G1, G2, G3 and G4; an autotransformer 28; and an anti-ripple reactor 29.

As shown, the tap-changing switches are divided into two groups. The switches 2, 4, 6, 8, 10, 12, 14, 16, 18, 20 and 22 are in one group and are connected to a pair of buses 44 and 46. The switches 2, 6, 10, 14, 18 and 22 are connected to the bus 44, and the switches 4, 8, 12, 16 and 20 are connected to the bus 46. The other group contains switches 3, 5, 7, 9, 11, 13, 15, 17, 19, 21 and 23 with the switches 3, 7, 11, 15, 19 and 23 connected to a bus 43 and the switches 5, 9, 13, 17 and 21 connected to a bus 45. A preventive coil 47 is connected across the buses 43 and 45, and a preventive coil 48 is connected across the buses 44 and 46. An anode bus 49 is connected to the midpoint of the preventive coil 47, and an anode bus 50 is connected to the midpoint of the preventive coil 48.

As shown in the drawings, the groups of rectifiers G1 and G3 are connected to the anode bus 49 through switches 63 and 65, respectively. Likewise, the groups G2 and G4 are connected to the anode bus 50 through switches 64 and 66, respectively. The groups G1 and G2 are connected to a cathode bus 67 which, in turn, is connected to the positive terminals of the motors M1 and M2. The groups G3 and G4 are connected to a cathode bus 68 which is connected to the positive terminals of the motors M3 and M4. The negative terminals of the motors are connected to the midtap of the secondary winding 25 through a conductor 69, the reactor 29 and the autotransformer 28.

In this instance, each of the groups G1, G2, G3 and G4 contains five rectifiers R which are of the igniter type. Each rectifier has an anode 71, a cathode 72 and an ignition electrode or igniter 73. The anodes of the rectifiers in each group are connected to their respective anode bus, and the cathodes of the rectifiers in each group are connected to their respective cathode bus. Thus, the rectifiers in each group operate in multiple or parallel.

In order to secure the proper division of load current between the rectifiers which operate in parallel, a balance coil 74 is connected in the anode circuit for each rectifier. As indicated by the broken line 75, the balance coils 74 for the rectifiers in the group G1 have a common magnetic circuit, thereby causing the balance coils to effect an equal division of current between the rectifiers in group G1. The rectifiers in each of the other groups are connected to their anode bus through balance coils in a similar manner, thereby effecting an equal division of the load current between the rectifiers in each group.

Since the rectifiers of the group G1 and the group G3, which are connected to the same anode bus 49, are connected to different groups of motors, it is not necessary to provide balance coils between the groups G1 and G3. Likewise, since the group G2 is connected to the motors M1 and M2 independently of the motors M3 and M4, which are supplied with current by the group G4, it is not necessary to provide balance coils between the groups G2 and G4, which are connected to the common anode bus 50.

In this manner, the number of balance coils required to secure the proper division of load between the rectifiers is reduced. Furthermore, the amount of current which can flow through a "backfire" circuit is reduced since all of the rectifiers are not connected to a common cathode bus. Thus, a "backfire" circuit in the group G2 is supplied only by the group G1 and not by the group G3, which is connected to a different cathode bus.

The ignition electrodes 73 of the rectifiers are connected to an impulse generator 76 through conductors 77, 78 and 79. The impulse generator comprises a linear reactor 81, a capacitor 82 and a saturating reactor 83. The capacitor 82 is connected across the transformer secondary winding 26 and is charged through the linear reactor 81. The capacitor voltage is applied to the reactor 83 until the current reaches a value at which the reactor 83 saturates. At this point the capacitor discharges through the reactor 83, and a large peak current passes through the igniters for the rectifiers. By utilizing rectifying devices 84 in the circuits as shown, the one impulse generator 76 may be utilized to provide ignition current for all of the groups of rectifiers.

In order to secure the proper division of ignition current between the igniters which are connected to a common conductor, balance coils 85 are provided. As shown, the balance coils 85 for each group of rectifiers have a common magnetic circuit 86.

The voltage applied to the traction motors M1 to M4 may be increased step-by-step by closing the tap-changing switches 2 to 23 in any suitable and known manner in the order shown in the sequence chart in Fig. 4. As indicated in the chart, the switches 2, 3, 4 and 5 are closed on the first step of acceleration. Thus, current is supplied to the motors M1 and M2 through the rectifiers of groups G1 and G2, which are connected to the secondary winding 25, through the switches 3, 5 and 2, 4, respectively.

During operation, one half cycle of current flows through the switches 3 and 5, the buses 43 and 45, the preventive coil 47, the switch 63, the rectifiers in group G1, the cathode bus 67, the motors M1 and M2, the conductor 69, the antiripple reactor 29, and the autotransformer 28 to the midtap of the secondary winding 25. The other half cycle of current flows from the secondary winding 25, through the switches 2 and 4, the buses 44 and 46, the preventive coil 48, the switch 64, the rectifiers of group G2, the cathode bus 67, the motors M1 and M2, the conductor 69, the reactor 29 and the autotransformer 28 to the midtap of the secondary winding 25.

As indicated by the sequence chart in Fig. 4, the switch 1 is on position D during the first step of acceleration. Since both terminals of the autotransformer 28 are connected to the same tap on the secondary winding 25, the autotransformer has no effect at this time. During the second step of acceleration, the switch 2 is opened, and the switch 6 is closed, thereby connecting both buses 44 and 46 to the same tap on the secondary winding 25.

At this time, the switch 1 is actuated to position U, thereby connecting the autotransformer 28 across a portion of the secondary winding 25. In this manner, the autotransformer 28 functions to equalize the voltage applied to the motors M1 and M2 during the two half cycles of operation. Otherwise, the motors would be subjected to a higher voltage during the half cycle in which current is flowing through the switches 4 and 6 than during the half cycle in which current is flowing through the switches 3 and 5 since the switch 3 is connected to a lower tap on the secondary winding 25 than the tap to which the switches 4 and 6 are connected.

On the third step of the acceleration, the switch 3 is opened, and the switch 7 is closed. Thus, the buses 43 and 45 are connected to a tap which corresponds in voltage to the tap to which the buses 44 and 46 are connected; therefore, the switch 1 is actuated to position D since it is not necessary to utilize the autotransformer 28 at this time to equalize the motor voltages.

As shown by the sequence chart, the switch 1 is actuated to its alternate positions on alternate steps of acceleration, thereby maintaining equalized voltages on the traction motors. The motors M3 and M4 are supplied with current by the groups G3 and G4 in the same manner as the motors M1 and M2 are supplied by the groups G1 and G2.

As shown in the drawings, power for operating the auxiliary units, such as compressor motors and blower motors, may be supplied by rectifiers AR1 and AR2, which are similar to the rectifiers R. The rectifiers AR1 and AR2 may be connected to taps on a portion of the secondary winding 25 as shown. Since the auxiliary motors operate at a constant speed, it is not necessary to provide tap-changing switches or other means for varying the voltage applied to the auxiliary units. The igniters of the rectifiers AR1 and AR2 may be energized by an impulse generator 87, which is connected to the transformer secondary winding 27. The impulse generator 87 functions in the same manner as the impulse generator 76 described hereinbefore.

In the modification of the invention shown in Fig. 2, the traction motors M1 and M2 are supplied with rectified current by groups of rectifiers G5, G6, G7, and G8. The groups G5 and G8 are connected to a cathode bus 90, which is connected to the positive terminal of the motor M1. The groups G5 and G7 are connected to a cathode bus 91, which is connected to the positive terminal of the motor M2. The negative terminals of the motors M1 and M2 are connected through a switch 92, a conductor 93 and an anti-ripple reactor 94 to the midtap of a secondary winding 95 of a transformer T2, which has a primary winding 96.

The anodes 71 of the three rectifiers in group G5 are connected to one terminal of a preventive coil 97 through balance coils 98. The three balance coils 98 for the rectifiers in group G5 have a common magnetic circuit 99. Likewise, the anodes of the three rectifiers in group G6 are connected to the other terminal of the preventive coil 97 through three balance coils 98 which have a common magnetic circuit. The midpoint of the preventive coil 97 is connected through a switch 101 and an anode bus 100 to the midpoint of a preventive coil 102. One end terminal of the preventive coil 102 is connected to a bus 104, and the other end terminal is connected to a bus 106. The bus 104 is connected to tap-changing switches 32, 36 and 40. The bus 106 is connected to tap-changing switches 34, 38 and 42. These tap-changing switches are connected to taps on one side of the midtap of the secondary winding 95.

Tap-changing switches 31, 35 and 39 are connected to a bus 105, and tap-changing switches 33, 37 and 41 are connected to a bus 107. The bus 105 is connected to one end terminal of a preventive coil 108. The bus 107 is connected to the other end terminal of the coil 108, the midpoint of which is connected through an anode bus 110 and a switch 109 to the midpoint of a preventive coil 111. The rectifiers in group G7 are connected to the one end terminal of the coil 111 through balance coils 98. Likewise, the rectifiers in group G8 are connected to the other end terminal of the preventive coil 111 through similar balance coils 98. As explained hereinbefore, the balance coils for each group of rectifiers have a common magnetic circuit 99.

The preventive coils 97 and 111 are so connected in the circuits for the rectifiers that they reduce the amount of current which can flow through a "backfire" circuit in any one group of rectifiers. Thus, assuming that a rectifier in group G8 should backfire during the half cycle of operation in which current is normally flowing through the groups G5 and G6, the backfiring current must flow through one-half of the preventive coil 97, the rectifiers in group G6, the cathode bus 90, one of the rectifiers in group G8 which is backfiring, one-half of the preventive coil 111 and back to the transformer secondary 95 through the preventive coil 108, the buses 105 and 107, and the tap-changing switches which happen to be closed at this time.

Since this backfiring current must flow through one-half of each of the preventive coils 97 and 111 in such a manner as to cause an unbalance in the currents in these preventive coils, they function to reduce the amount of backfiring current, thereby reducing the amount of damage which could be caused by a "backfire" in any one of the rectifiers.

As shown by the sequence chart in Fig. 5, the voltage applied to the motors may be increased step-by-step by closing the tap-changing switches in the order shown by the chart. Switches P1 and P2, which are connected across the end terminals of the preventive coils 108 and 102 respectively, are closed at certain times during the tap-changing operation to balance the currents through their respective preventive coils in a manner well known in the art.

The ignition electrodes 73 of the rectifiers R may be energized by impulse generators 112 in the manner hereinbefore described. The impulse generators may be energized from windings on the transformer T2 or from a separate source of alternating current, if desired.

In the modification of the invention shown in Fig. 3, the motor M1 is supplied with current by rectifiers R1 and R2, and the motor M2 is supplied with current by rectifiers R3 and R4. The rectifiers R1 and R3 are connected to an anode bus 120 through switches 121 and 123, respectively. The rectifiers R2 and R4 are connected to an anode bus 125 through switches 122 and 124, respectively. The anode bus 120 is connected to the midpoint of a preventive coil 126, which is connected across buses 127 and 128. Tap-changing switches 52, 56 and 60 are connected to the bus 128, and tap-changing switches 54, 58 and 62 are connected to the bus 127. A switch P4 is connected across the preventive coil 126 and is closed at certain times during the operation of the tap-changing switches as indicated in the sequence chart in Fig. 6.

The anode bus 125 is connected to the midpoint of a preventive coil 129, which is connected across buses 131 and 132. Tap-changing switches 53, 57 and 61 are connected to the bus 131; and switches 51, 55 and 59 are connected to the bus 132. A switch P3 is connected across the preventive coil 129 and is closed at certain times as indicated by the chart in Fig. 6.

The tap-changing switches are connected to a secondary winding 133 of a transformer T3, which has a primary winding 134. The transformer T3 also has a secondary winding 135, which is utilized to supply energy to impulse generators 136 and 137.

As shown, each one of the rectifiers has an anode 138, a cathode 139 and three ignition electrodes 141. The ignition electrodes of the rectifier R1 are connected to the impulse generator 136 through balance coils 142 which have a common magnetic circuit 143. Likewise, the ignition electrodes 141 of the rectifier R2 are connected to the impulse generator 136 through three balance coils 142 which have a common magnetic circuit 143.

The three electrodes of the rectifier R3 are connected to the impulse generator 137 through balance coils 142, and the three electrodes of the rectifier R4 are also connected to the impulse generator 137 through similar balance coils 142. Thus, the ignition current for each one of the rectifiers is equally divided between the three electrodes for that rectifier.

The impulse generators 136 and 137 are similar to the impulse generator 76, previously described, with the exception that a phase-shifting reactor 144 is provided in place of the linear reactor 81 previously described. The phase-shifting reactor 144 has a coil 145 which is energized by direct current.

During the operation of the rectifiers, the voltage applied to the motors may be controlled within certain limits by varying the saturating current in the direct current coils 145 by adjusting rheostats 146, thereby causing a change in the phase position of the igniter impulses and controlling the voltage of the rectifiers.

As explained hereinbefore, the voltage applied to the motors may also be controlled by the operation of the tap-changing switches 51 to 62 in the order shown in the sequence chart in Fig. 6. Thus, if desired, the voltage steps obtained by means of the tap-changing switches may be supplemented by utilizing the phase-shifting impulse generators to obtain additional steps of acceleration.

Since the rectifiers R1 and R3, which are connected to a common anode bus 120, are connected to two different cathode buses 147 and 148, respectively, and these cathode buses are connected to different motors, it is not necessary to utilize balance coils to divide the current between these two rectifiers. Likewise, the rectifiers R2 and R4, which are connected to the anode bus 125, are connected to the cathode buses 147 and 148, respectively. The motors M1 and M2 are connected to the midtap of the secondary winding 133 through a conductor 149 and an anti-ripple reactor 151.

During operation, the motor M1 receives one half cycle of current through the rectifier R1; and the motor M2 receives a half cycle of current through the rectifier R3. The other half cycle of current is supplied to the motor M1 by the rectifier R2 and the motor M2 is supplied by the rectifier R4.

As previously explained, the voltage applied to the motors may be increased in a step-by-step manner by closing the tap-changing switches in the order shown in the chart in Fig. 6. The voltage may also be controlled by varying the current in the saturating reactors 144, as explained hereinbefore. The operation of the tap-changing switches 51 to 62 may be controlled in any suitable manner well known in the art. Likewise, the rheostats 146 may be adjusted by suitable and well known control means.

From the foregoing description, it is apparent that I have provided for controlling the operation of a plurality of rectifiers, which are operated in multiple or parallel-circuit relation to supply current to the traction motors of a locomotive or other electrically-operated vehicle. Equal division of load between the rectifiers is obtained with a minimum amount of equipment, and the rectifiers are so connected as to reduce the amount of current which can flow during a "backfiring" condition in any one of the rectifiers. Furthermore, continuity of operation is assured by providing more than one rectifier for each motor and/or by providing more than one ignition electrode for each rectifier, thereby making it possible to utilize rectifiers of the igniter type on a moving vehicle.

Since numerous changes may be made in the above-described construction and different embodiments of the invention may be made without departing from the spirit and scope thereof, it is intended that all matter contained in the foregoing description or shown in the accompanying drawings shall be interpreted as illustrative and not in a limiting sense.

I claim as my invention:

1. In a control system for an electrically-operated vehicle, in combination, a plurality of motors for propelling the vehicle, a transformer having a primary winding and a secondary winding, a plurality of rectifiers for supplying rectified current to the motors, a plurality of tap-changing switches for connecting the rectifiers to said secondary winding, said switches being divided into two groups with a pair of buses for each group, alternate switches of each group being connected to the same bus, a preventive coil connected across each pair of buses, at least two of said rectifiers being connected to the midpoint of each preventive coil, and said motors being connected to rectifiers which are connected to different preventive coils.

2. In a control system for an electrically-operated vehicle, in combination, a plurality of motors for propelling the vehicle, a transformer having a primary winding and a secondary winding, a plurality of rectifiers for supplying rectified current to the motors, a plurality of tap-changing switches for connecting the rectifiers to said secondary winding, said switches being divided into two groups with a pair of buses for each group, alternate switches of each group being connected to the same bus, a preventive coil connected across each pair of buses, at least two of said rectifiers being connected to the midpoint of each preventive coil, and certain of said motors being connected to certain of said rectifiers independently of the other motors.

3. In a control system for an electrically-operated vehicle, in combination, a plurality of motors for propelling the vehicle, a transformer having a primary winding and a secondary winding, a plurality of rectifiers for supplying rectified current to the motors, a plurality of tap-changing switches for connecting the rectifiers to said secondary winding, said switches being divided into two groups with a pair of buses for each group, alternate switches of each group being connected to the same bus, a preventive coil connected across each pair of buses, at least two of said rectifiers being connected to the midpoint of each preventive coil, and circuit means for connecting cooperating rectifiers to a motor independently of the other rectifiers.

4. In a control system for an electrically-operated vehicle, in combination, a plurality of motors for propelling the vehicle, a transformer having a primary winding and a secondary winding, a plurality of rectifiers for supplying rectified current to the motors, a plurality of tap-changing switches for connecting the rectifiers to said secondary winding, said switches being divided into two groups with a pair of buses for each group, alternate switches of each group being connected to the same bus, a preventive coil connected across each pair of buses, an anode bus connected to the midpoint of each preventive coil, at least two of said rectifiers being connected to each anode bus, and cathode buses connected to rectifiers which are connected to different anode buses, each cathode bus being connected to a motor independently of the other cathode buses.

5. In a control system for a locomotive, in combination, a plurality of motors for propelling the locomotive, a transformer having a primary winding and a secondary winding, a plurality of rectifiers for supplying rectified current to the motors, a plurality of tap-changing switches for connecting the rectifiers to said secondary winding, said switches being divided into two groups with a pair of buses for each group, alternate switches of each group being connected to the same bus, a preventive coil connected across each pair of buses, an anode bus connected to the midpoint of each preventive coil, at least two of said rectifiers being connected to each anode bus, cathode buses connected to rectifiers which are connected to different anode buses, each cathode bus being connected to a motor independently of the other cathode buses, and a conductor for connecting all of said motors to said secondary winding.

6. In a control system for a locomotive, in combination, a plurality of motors for propelling the locomotive, a transformer having a primary winding and a secondary winding, a plurality of groups of rectifiers for supplying rectified current to the motors, circuit means for connecting cooperating groups of rectifiers to a motor independently of the other groups, and a plurality of tap-changing switches for connecting the rectifiers to the secondary winding of said transformer.

7. In a control system for a locomotive, in combination, a plurality of motors for propelling the locomotive, a transformer having a primary winding and a secondary winding, a plurality of groups of rectifiers for supplying rectified current to the motors, circuit means for connecting cooperating groups of rectifiers to a motor independently of the other groups, a plurality of tap-changing switches for connecting the rectifiers to the secondary winding of said transformer, and balance coils interconnecting the rectifiers in each group.

8. In a control system for a locomotive, in combination, a plurality of motors for propelling the locomotive, a transformer having a primary winding and a secondary winding, a plurality of groups of rectifiers for supplying rectified current to the motors, circuit means for connecting cooperating groups of rectifiers to a motor independently of the other groups, a plurality of tap-changing switches for connecting the rectifiers to the secondary winding of said transformer, balance coils interconnecting the rectifiers in each group, said balance coils for each group having a common magnetic circuit.

9. In a control system for an electrically-operated vehicle, in combination, a plurality of motors for propelling the vehicle, a transformer having a primary winding and a secondary winding, a plurality of rectifiers for supplying rectified current to the motors, a plurality of tap-changing switches for connecting the rectifiers to the secondary winding of the transformer, and an auxiliary transformer for connecting the motors to said secondary winding.

10. In a control system for a locomotive, in combination, a plurality of motors for propelling the locomotive, a transformer having a primary winding and a secondary winding, a plurality of rectifiers for supplying rectified current to the motors, a plurality of tap-changing switches for connecting the rectifiers to the secondary winding of the transformer, an auxiliary transformer for connecting the motors to said secondary winding, and switching means for controlling the energization of said auxiliary transformer.

11. In a control system for a locomotive, in combination, a pair of motors for propelling the locomotive, a transformer having a primary winding and a secondary winding, a plurality of rectifiers for supplying rectified current to the motors, two groups of tap-changing switches for connecting the rectifiers to said secondary winding, an anode bus connected to each group of switches, a preventive coil connected to each anode bus, at least two of said rectifiers being connected to opposite ends of each preventive coil, and circuit means for connecting each one of said motors to rectifiers which are connected to different preventive coils.

12. In a control system for a locomotive, in combination, a pair of motors for propelling the locomotive, a transformer having a primary winding and a secondary winding, a plurality of rectifiers for supplying rectified current to the motors, two groups of tap-changing switches for connecting the rectifiers to said secondary winding, an anode bus connected to each group of switches, a preventive coil connected to each anode bus, at least one rectifier being connected to each end of each preventive coil, and circuit means for connecting each one of said motors to rectifiers which are connected to different preventive coils.

13. In a control system for a locomotive, in combination, a pair of motors for propelling the locomotive, a transformer having a primary winding and a secondary winding, a plurality of rectifiers for supplying rectified current to the motors, two groups of tap-changing switches for connecting the rectifiers to said secondary winding, an anode bus connected to each group of switches, a preventive coil connected to each anode bus, at least one rectifier being connected to each end of each preventive coil, and circuit means for connecting each one of said motors to the rectifiers which are connected to corresponding ends of said preventive coils.

14. In a control system for a locomotive, in combination, a pair of motors for propelling the locomotive, a transformer having a primary winding and a secondary winding, a plurality of rectifiers for supplying rectified current to the motors, two groups of tap-changing switches for connecting the rectifiers to said secondary winding, an anode bus connected to each group of switches, a preventive coil connected to each anode bus, more than one rectifier being connected to each end of each preventive coil, balance coils interconnecting the rectifiers connected to the same end, and circuit means for connecting each one of said motors to rectifiers which are connected to different preventive coils.

15. In a control system for a locomotive, in combination, a pair of motors for propelling the locomotive, a transformer having a primary winding and a secondary winding, a plurality of rectifiers for supplying rectified current to the motors, two groups of tap-changing switches for connecting the rectifiers to said secondary winding, an anode bus connected to each group of switches, a preventive coil connected to each anode bus, more than two of said rectifiers being connected to each end of each preventive coil, balance coils interconnecting the groups of rectifiers connected to the same end, said balance coils for each group having a common magnetic circuit, and circuit means for connecting each one of said motors to the rectifiers which are connected to corresponding ends of said preventive coils.

16. In a control system for a locomotive, in combination, a plurality of motors for propelling the locomotive, a transformer having a primary winding and a secondary winding, a plurality of tap-changing switches connected to the secondary winding, said switches being divided into two groups with a pair of buses for each group, a preventive coil connected across each pair of buses, an anode bus connected to each preventive coil, at least two rectifiers connected to each anode bus with each motor connected to rectifiers on different buses, each rectifier having at least three ignition electrodes, balance coils interconnecting the electrodes for each rectifier, and impulse generating means for energizing said electrodes through said balance coils.

17. In a control system for a locomotive, in combination, a plurality of motors for propelling the locomotive, a transformer having a primary winding and a secondary winding, a plurality of tap-changing switches connected to the secondary winding, said switches being divided into two groups with a pair of buses for each group, a preventive coil connected across each pair of buses, an anode bus connected to each preventive coil, a plurality of rectifiers connected to each anode bus with each motor connected to two rectifiers which are connected to different buses, each rectifier having at least three ignition electrodes, balance coils interconnecting the electrodes for each rectifier, and impulse generating means for energizing said electrodes through said balance coils.

18. In a control system for a locomotive, in combination, a plurality of motors for propelling the locomotive, a transformer having a primary winding and a secondary winding, a plurality of tap-changing switches connected to the secondary winding, said switches being divided into two groups with a pair of buses for each group, a preventive coil connected across each pair of buses, an anode bus connected to each preventive coil, a plurality of rectifiers connected to each anode bus with each motor connected to two rectifiers which are connected to different buses, each rectifier having at least three ignition electrodes, balance coils interconnecting the electrodes for each rectifier, and phase-shifting impulse generating means for energizing said electrodes through said balance coils.

19. In a control system for a locomotive, in combination, a plurality of motors for propelling the locomotive, a transformer having a primary winding and a secondary winding, a plurality of tap-changing switches connected to the secondary winding, said switches being divided into two groups with a pair of buses for each group, a preventive coil connected across each pair of buses, an anode bus connected to each preventive coil, a plurality of rectifiers connected to each anode bus with each motor connected to two rectifiers which are connected to different buses, each rectifier having at least three ignition electrodes, balance coils interconnecting the electrodes for each rectifier, and phase-shifting impulse generating means for energizing said electrodes through said balance coils, said impulse generating means being energized from said transformer.

LLOYD J. HIBBARD.

REFERENCES CITED

The following references are of record in the file of this patent:

UNITED STATES PATENTS

| Number | Name | Date |
|---|---|---|
| 1,204,411 | Conrad et al. | Nov. 14, 1916 |
| 2,005,875 | Silverman | June 25, 1935 |
| 2,417,755 | Hibbard | Mar. 18, 1947 |